United States Patent [19]

Emmert et al.

[11] 4,343,394

[45] Aug. 10, 1982

[54] APPARATUS FOR HANDLING FLUENT MATERIAL

[75] Inventors: Joseph W. Emmert; Lawrence J. Sweeney, both of Willow Street, Pa.

[73] Assignee: Addare Corp., Willow Street, Pa.

[21] Appl. No.: 161,889

[22] Filed: Jun. 23, 1980

[51] Int. Cl.³ .................. B65G 33/12; B65G 33/30
[52] U.S. Cl. .................. 198/616; 198/558; 198/658; 198/669; 415/74
[58] Field of Search .............. 198/558, 616, 658, 663, 198/664, 669; 415/65, 72, 73, 74

[56] References Cited

U.S. PATENT DOCUMENTS 589,532  9/1897  McCoskey ........................... 415/74

FOREIGN PATENT DOCUMENTS 1034480  7/1953  France ................................. 198/658
920138  3/1963  United Kingdom ................... 415/74

Primary Examiner—Jeffrey V. Nase
Attorney, Agent, or Firm—Howson and Howson

[57] ABSTRACT

Apparatus for pumping or conveying fluent material such as grain, sand, concrete, etc. is disclosed. The apparatus comprises a tube having an inlet at one end and an outlet spaced from the inlet and a pair of helical blades of opposite pitch mounted inside the tube for rotation relative to one another. One blade is mounted to a shaft extending axially inside the tube, and the other blade is mounted to the inside of the tube. The blades are interrupted at diametrical locations to enable the blades to move relative to one another as the shaft rotates relative to the tube for conveying fluent material. Preferably, the assembly is mounted with its inlet in a hopper and its tube disposed upright to afford vertical conveyance of the fluent material through substantial distances.

8 Claims, 14 Drawing Figures

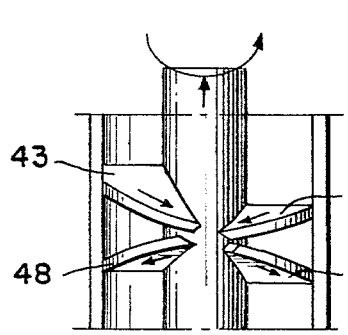
F I G. 5.
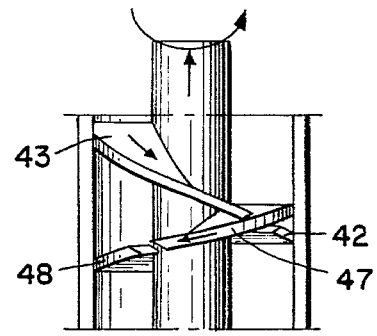
F I G. 6.
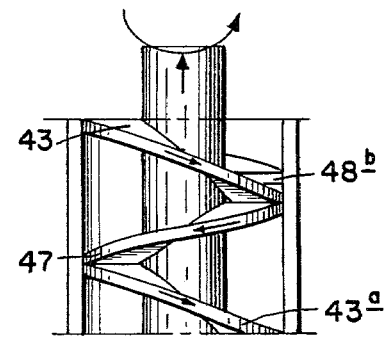
F I G. 7.
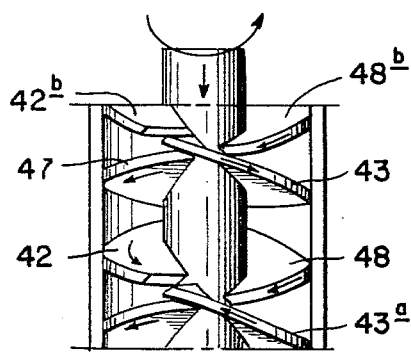
F I G. 8.
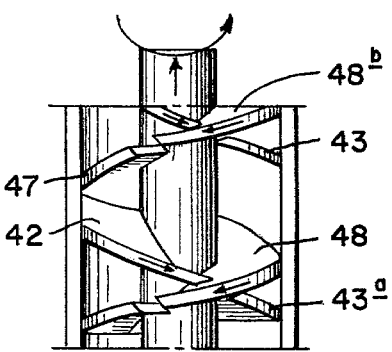
F I G. 9.
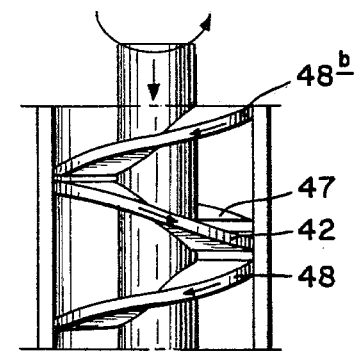
F I G. 10.
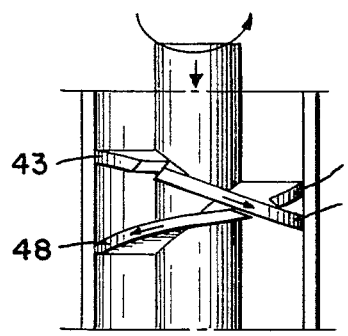
F I G. 11.
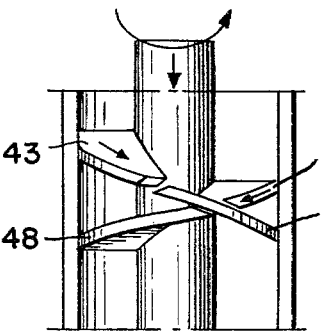
F I G. 12.
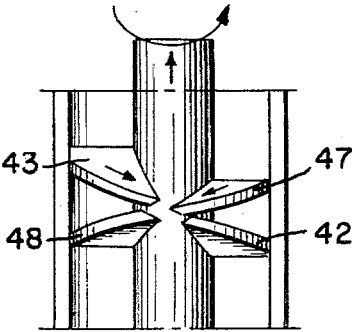
F I G. 13.

APPARATUS FOR HANDLING FLUENT MATERIAL

FIELD OF THE INVENTION

The present invention relates to power conveyors, and more particularly, the present invention relates to auger-type power conveyors for handling fluent material.

BACKGROUND OF THE INVENTION

For many years, it has been known to convey solid fluent materials such as grain, sand, etc. by means of auger-type conveyors. Such conveyors customarily comprise an elongated tube within which is mounted a helical blade connected at one end to a source of power which rotates the blade to displace the fluent material along the inside of the tube. While such conveyors have been entirely satisfactory in many different types of installations, they have certain limitations.

One of the primary disadvantages of conventional auger-type conveyors resides in the fact that in elevating solid fluent material, the conveyor must be inclined between the two different elevations. While an auger-type conveyor may be used to vertically lift solid fluent material to short distances, the tendency for such material to slide relative to the helical blades effectively prevents auger-type conveyors from being used to lift solid fluent material through substantial vertical distances. As a result, in order to lift such materials through substantial vertical heights, the auger-type of power conveyors customarily incline relative to the horizontal. Obviously, this has the disadvantage of requiring a greater length of conveyor for a given height of lift with a concomitant increase in cost and mounting problems.

OBJECTS OF THE INVENTION

With the foregoing in mind, it is a primary object of the present invention to provide an improved auger-type power conveyor.

It is another object of the present invention to provide a novel auger-type power conveyor which is capable of lifting solid fluent materials to substantial vertical heights.

A still further object of the present invention is to provide a unique power auger conveyor assembly which operates efficiently to displace fluent materials vertically for substantial distances.

SUMMARY OF THE INVENTION

In summary, the invention provides apparatus which is particularly suited for displacing fluent material. The apparatus comprises a tube having an inlet at one end and an outlet spaced from the inlet. A shaft extends axially inside the tube and is mounted for combined rotary and axial motion. A helical blade is mounted to the shaft, and a helical blade of a pitch opposite to the shaft-mounted blade is mounted inside the tube. The helical blades are interrupted at diametrical locations by narrow gaps which enable the blades to pass through one another in overlapping relation when the shaft is rotated relative to the tube. As a result, rotary motion of the shaft relative to the tube alternately raises and lowers the shaft-mounted blade relative to the tubemounted blade to displace fluent material upwardly in increments each time the shaft moves vertically.

BRIEF DESCRIPTION OF THE DRAWINGS

The foregoing and other objects, features and advantages of the present invention should become apparent from the following description when taken in conjunction with the accompanying drawings in which:

FIGS. 5-13 are schematic views illustrating sequentially the cooperation of the blade sections as the shaft and tube and rotated relative to one another for displacing fluent material.

DESCRIPTION OF THE PREFERRED EMBODIMENT

Figure 1:
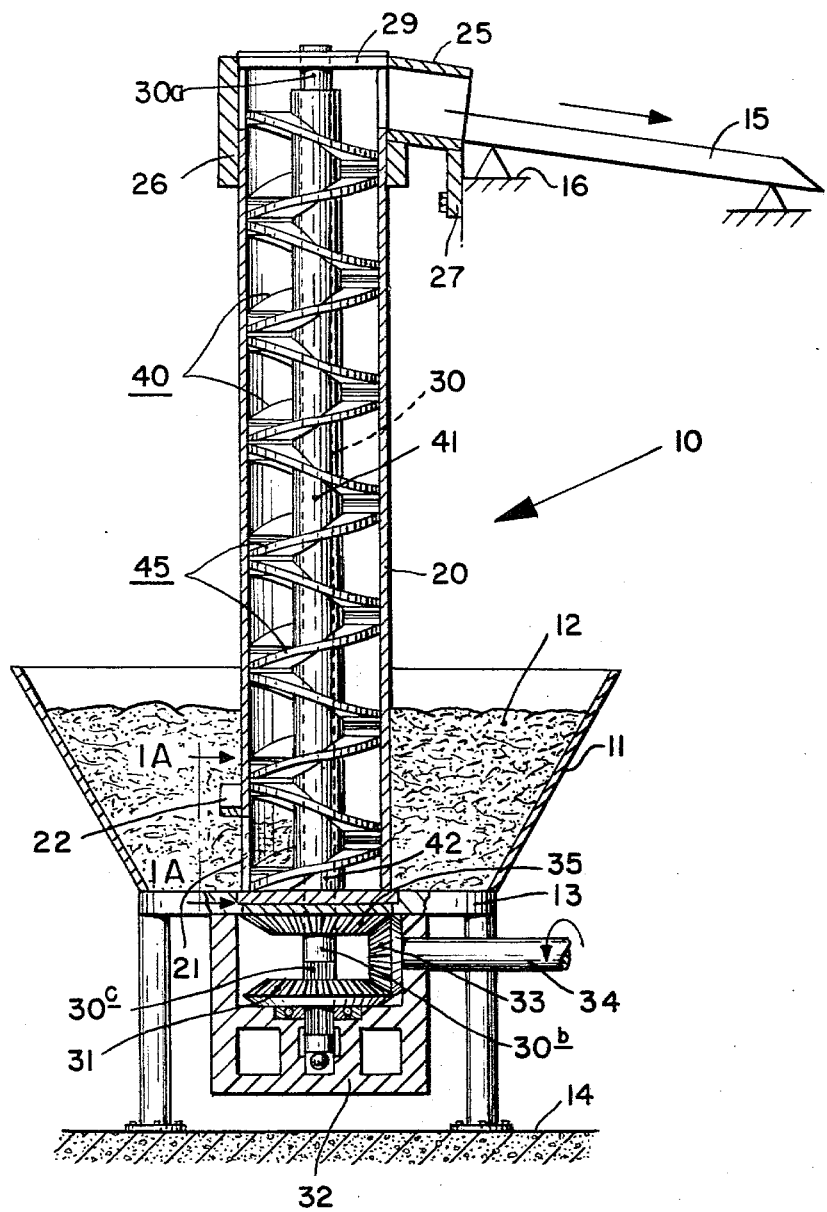
FIG. 1 is a side elevational view of a preferred embodiment of the present invention, portions having been broken away and sectioned to illustrate various internal details of construction.

Referring now to the drawings, FIG. 1 illustrates fluent material handling apparatus 10 which embodies the present invention. As best seen therein, the apparatus 10 comprises a hopper 11 of an inverted, frusto-conical shape and adapted to contain a solid, particulate fluent material 12, such as grain, sand, cement, etc. The hopper 11 is mounted on a pedestal 13 above a supporting surface 14.

According to the present invention, the fluent material 12 is capable of being displaced vertically a substantial distance from a location adjacent the lower level 14 to a discharge chute 15 located at an upper level 16. The chute 15 may be used to direct the fluent material 12 into the top of a storage vessel, such as a grain elevator; or if the fluent material 12 is cement, the chute 15 may be used to convey the cement 12 to its pouring location. Regardless of the nature of the fluent material 12, however, the important aspect of the present invention is its ability to lift the fluent material 12 vertically through substantial distances as contrasted with conventional auger-type conveyors which are limited in this respect.

Figure 1A:
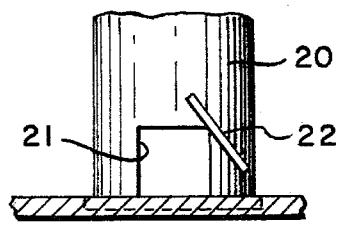
FIG. 1A is a sectional view taken on line 1A-1A of FIG. 1 to illustrate an inlet in the lower end of the tube.

The apparatus utilizes cooperating helical blades arranged inside a housing to rotate in opposite directions to displace the fluent material. For this purpose the apparatus 10 further comprises an upstanding elongated housing or tube 20 which has its lower end rotatably mounted in the hopper 11. A lateral inlet 21 (FIG. 1A) is provided in the lower end of the tube 20 to enable the fluent material 12 in the hopper to enter the inside of the tube 20 at its lower end. A vane or impeller 22 is mounted to the outside of the tube 20 adjacent the opening 21 and functions when the tube 20 rotates to assist in displacing the fluent material 12 laterally into the opening 21. Preferably, the vane 22 slopes downwardly and rearwardly relative to the direction of movement of the tube 20, such as illustrated in FIG. 1A.

The fluent material 12 is discharged from a lateral outlet 25 located at the upper end of the tube 20 as the tube rotates. To this end, the upper end of the tube 20 is rotatably received in an outlet manifold 26 connected by a bracket 27 to a part of the structure at the upper level 16. The manifold 26 surrounds completely the upper end of the tube 20 and operates upon rotation of the tube 20 to insure expulsion of the fluent material 12 into the chute 15. The manifold 26 and bracket 27 also functions to steady the upper end of the tube. A closure 29 extends across the upper end of the tube 20 and manifold 26 in the manner illustrated to ensure lateral expulsion of the fluent material.

A shaft 30 extends vertically and axially inside the tube 20 and is rotatably and slidably mounted at its upper end 30a in the closure plate 29. The lower end 30b of the shaft 30 has a splined section 30c which is connected to a bevel gear 31 rotatably mounted inside a gear housing 32. The bevel gear 31 is connected to a bevel gear pinion 33 which in turn is mounted to a shaft 34 connected to a source of power (not shown) such as an electric motor, an internal combustion engine, etc. The pinion bevel gear 33 also engages a bevel gear 35 which is connected directly to the tube 20 for causing the tube 20 to rotate in unison therewith. Thus, rotation of the shaft 34 in the direction indicated by the arrow in FIG. 1 (counterclockwise looking leftward) causes the shaft 30 to rotate counterclockwise (looking downward in FIG. 1) and the tube 20 to rotate in the opposite direction to the shaft 30.

According to the present invention, cooperating blade means is provided inside the tube 20 for displacing the fluent material 12 vertically. To this end, the blade means includes a first helical blade assembly 40 and a second helical blade assembly 45. The first blade assembly 40 is mounted to a sleeve 41 which surrounds the shaft 30, and the second-mentioned blade assembly 45 is secured to the inside of the tube 20. A drive pin 42 connects the first blade assembly sleeve 41 to the shaft 30 adjacent its lower end. The first (shaft-mounted) blade assembly 40 has a predetermined pitch (turns per foot) and a predetermined hand (right or left). The second (tube-mounted) blade assembly 45 has a pitch identical to the first blade assembly 40 but of the opposite hand. In the illustrated embodiment, the shaft-mounted blade assembly 40 is of left hand, and the tube-mounted blade assembly is of right hand.

Figure 3:
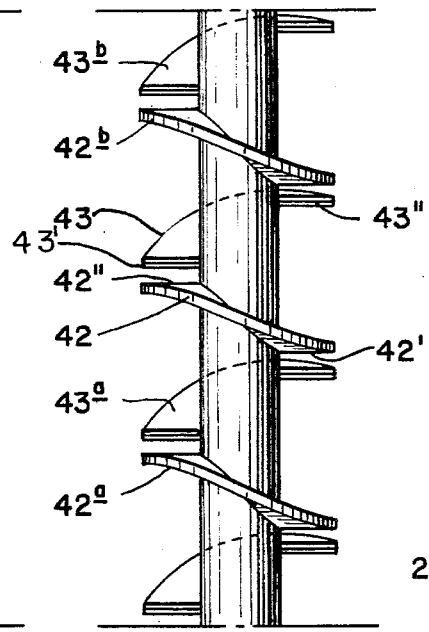
FIG. 3 is an elevational view of a section of the shaft illustrated in FIG. 1 and showing the manner in which blade sections are mounted to the shaft.

As best seen in FIG. 3, the first blade assembly 40 comprises a pair of blade segments or sections 42 and 43 welded or otherwise fastened to the mounting sleeve 41. Each blade section, such as the leading blade section 42 extends through an arc of almost 180° around its mounting sleeve 41, and the upper or trailing blade section 43 also extends through an arc of almost 180° for cooperating with the blade 42 to provide one complete revolution or pitch of blade around the mounting sleeve 41. Blade sections 42a and 42b, and 43a and 43b, similar to blade sections 42 and 43, respectively, are similarly mounted to the sleeve 41 in axially spaced relation with their respective blade sections in the manner illustrated in FIG. 3.

For purposes of illustration, the various blade sections are shown offset axially relative to one another; however, it should be understood that the various blade sections are disposed on the mounting sleeve 41 in such a manner as to define a generally smooth helical path along the length of the mounting sleeve 41.

Each blade section, such as the blade section 42, has a leading edge 42' and a trailing edge 42". The edges 42' and 42" extend radially outward orthogonal to the mounting sleeve 41 at diametrical locations. The companion blade segment 43 has similar leading and trailing edges 43' and 43", respectively. The trailing edge of the blade segment 42 is spaced from the leading edge 43' of the blade 43 to provide a gap between the blade segments at diametrical locations, the functions of which will become apparent hereinafter. Thus, alternate ones of the blade sections are aligned axially with one another, and the gaps are also aligned axially with one another.

Figure 2:
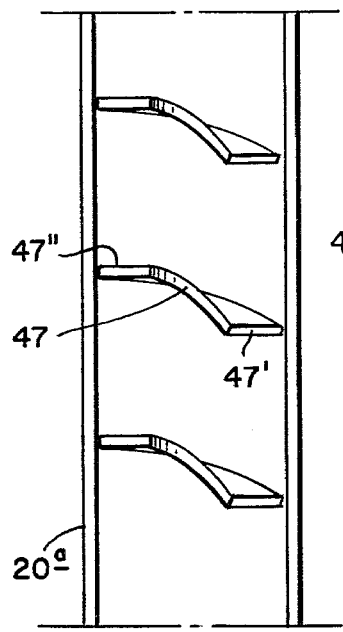
FIG. 2 is an elevational view of a section of the tube illustrated in FIG. 1 and showing the mounting of blade sections therein.
Figure 4:
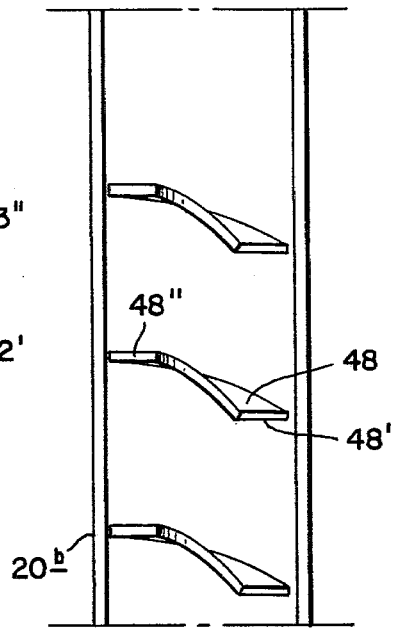
FIG. 4 is an elevational view similar to FIG. 2 but illustrating a section of the tube complementary to the section of FIG. 2.

As noted heretofore, the blade assembly mounted to the inside of the tube 20 is of the same pitch as the blade assembly 40 but is opposite in hand. To facilitate assembly, the tube 20 is divided lengthwise to halves 20a and 20b. See FIGS. 2 and 4. The tube-mounted blade assembly 45, similarly to the shaft-mounted blade assembly 40, is divided into sections or segments. For instance, as best seen in FIG. 2, a section 47 of a blade is mounted on the inside of the tube half 20a. The blade section 47 extends to an arc of almost 180° and has a leading edge 47' and a trailing edge 47" both disposed orthogonal with respect to the central longitudinal axis of the tube 20. A complementary blade section 48 is mounted in the right hand tube half 20b and has leading and trailing edges 48' and 48", respectively. It is noted that the companion blade section 48 is mounted at a level lower than the blade section 47, and its trailing edge 48" is so located with respect to the leading edge 47' of the blade 47 as to be spaced from the latter by a gap when the tube halves 20a and 20b are juxtaposed in the manner illustrated in FIG. 1. It is noted that similar blade sections 47a, 47b, and 48a, 48b are mounted in the tube halves 20a and 20b, respectively in a manner similar to the aforementioned blade sections 47 and 48. Thus, when the halves 20a and 20b are fastened together, preferably by clamps (not shown) the gaps extend radially between adjacent trailing and leading edges in a manner somewhat similar to the manner in which gaps are provided between the blade sections illustrated in FIG. 3.

When the tube halves 20a and 20b are assembled in the manner illustrated in FIG. 1, the second blade sections mounted to the tube 20 cooperate with the first blade sections mounted to the shaft sleeve 41 to provide a vertical pumping action when the tube 20 is rotated relative to the shaft 30 and its sleeve 41. In pumping fluent material vertically, the shaft 30 and blade mounting sleeve 41 oscillate vertically as the shaft 30 and tube 20 rotate relative to one another. This oscillation is caused by the action of the shaft-driven blade assembly 40 being first displaced vertically upward in one half of a revolution and then being displaced vertically downward through the same distance during the second half of the revolution. The vertical reciprocation is effected by the interaction of the shaft-driven blade sections with the tube-driven blade sections. On each up movement of the shaft-driven blade sections, fluent material is advanced from one tube-driven blade section to a higher level tube-driven blade section, and on the remaining portion of the shaft rotation, the shaft blade is wiped clean as the shaft is being displaced downwardly on the balance of the shaft rotation. Since the fluent material is thereby displaced upwardly in increments and is, during portions of the cycle, at rest relative to the tube-driven blade sections, the apparatus of the present invention is capable of displacing the fluent material vertically through greater distances than would be possible with a conventional auger-type conveyor where there would be a tendency for the fluent material simply to slide relative to the auger if an attempt were made to displace the fluent material vertically through too great a distance.

For the purpose of attempting visually to explain the function of the apparatus, reference is made to schematic FIGS. 5–13 which illustrate in sequential views the interaction of the blade sections as a pair of tube-driven blade sections rotate relative to a pair of shaft-driven blade sections. In these views, the shaft may be viewed as rotating in the direction indicated by the arrows and the tube viewed as rotating in the opposite direction through the same included angle. In the position illustrated in FIG. 5, the leading shaft-mounted blade section 42 and its companion trailing blade section 43 are shown with the gap between their respective leading and trailing edges 42' and 43" about in registry with a gap between the tube-mounted blade sections 47 and 48. The blade sections in this position may be referred to as in their home position.

Referring now to FIG. 6, it may be seen that the trailing shaft-driven blade section 43 has its leading edge 43' riding rightward along the upper surface of the tube-driven blade section 47 which in turn is advancing leftward in FIG. 6. The shaft sleeve 41 is moving upwardly.

As the blades continue to advance, they assume the position illustrated in FIG. 7, where the shaft-driven blade 43 is about to pass between the gap between blade sections 47 and 48b.

Referring now to FIG. 8, it may be seen that the shaft-driven blade section 43 has passed between the gaps between tube-driven blade sections 47 and 48b and is beginning to advance below the blade section 48b which wipes the upper surface of the blade 43.

As seen in FIG. 9, the action of the shaft driven blade section 42 has its leading edge 42' riding rightward along the upper surface of tube-driven blade section 48 which in turn is advancing leftward in FIG. 9. The shaft sleeve 41 is moving upwardly.

As the blades continue to advance, they assume the position illustrated in FIG. 10, where the shaft-driven blade 42 is about to pass between the gap between blade sections 48 and 47.

Referring now to FIG. 11, it may be seen that the shaft-driven blade 42 is passing between the gaps between tube-driven blade sections 48 and 47 and is beginning to advance below the blade section 47 which wipes the upper surface of the blade 42.

As seen in FIG. 12 the action of the blade 47 on the blade 42 causes the shaft 41 to move vertically downward until the blades assume the home position illustrated in FIG. 13 which is the home position of the blades illustrated in FIG. 5 at the start of the cycle. Thus, it may be seen that during the upward movement of the shaft-driven blades, fluent material is displaced upwardly, and during the downward movement of the shaft-driven blades, the fluent material is wiped from the upper surfaces of the shaft-driven blades and remains on the upper surface of the tube-driven blades. The disposition of the various blade sections in helixes of opposite hand insures that the material advances vertically upward from the inlet 21 to the outlet 25 at the upper end of the tube 20 and thence from the manifold 26 to the chute 15. Rotation of the vane 22 with the tube 20 in the hopper 12 insures continuous agitation of the material in the hopper 12 and assists in infeeding the fluent material 12 into the inlet 21 of the tube 20. Also, the splined interconnection 30c with the bevel gear 31 insures the relative axial movement between the shaft-driven blade sections and tube-mounted blade sections as noted heretofore.

In view of the foregoing, it should be apparent that the present invention now provides an improved auger-type conveyor which is particularly suited for displacing solid particulate material vertically.

While the apparatus is particularly suited for vertical lifting it should be apparent that it may be used to convey materials horizontally or inclined. Moreover, the present invention provides the advantage of thoroughly mixing the material as it advances, so that it may be used as a mixer, if desired.

Thus, while a preferred embodiment of the present invention has been described in detail, various modifications, alterations and changes may be made without departing from the spirit and scope of the invention as defined in the appended claims.

We claim:

1. Apparatus for displacing fluent material, comprising:
   a tube having an inlet at one location and an outlet spaced from said inlet,
   a shaft extending axially inside said tube,
   means mounting said shaft for combined rotary and axial motion relative to said tube,
   a first helical blade mounted to said shaft,
   a second helical blade of a pitch opposite said first helical blade mounted to said tube,
   said first and second helical blades each being interrupted at diametrical locations by a pair of edges defining narrow gaps, said gaps being arranged relative to one another so that said shaft mounted blades pass through the gaps in the tube mounted blades and said tube-mounted blades pass through the gaps in the shaft mounted blades when said blades are rotated relative to one another, and
   means for rotating said first blade relative to said second blade,
   whereby fluent material admitted into the tube at its inlet is displaced axially therein to exit from the outlet.

2. Apparatus according to claim 1 wherein said interruptions divide the blades into two blade sections per pitch unit, said blade sections on the shaft cooperating with the blade sections on the tube to displace the shaft and its blades alternately in opposite directions as the shaft rotates in one direction.

3. Apparatus according to claim 1 wherein said tube is divided diametrically lengthwise in halves with one series of the tube-mounted blade sections being mounted in one half and the other series of the tube-mounted blade sections being mounted in the other half, said blade sections being disposed so that the gaps therebetween coincide with the lengthwise divisions of the tube halves.

4. Apparatus according to claim 1 wherein said blades are disposed orthogonal to the rotational axis of the shaft, and the gaps in said blades are defined by closely-spaced edges extending radially with respect to the center of the shaft.

5. Apparatus according to claim 1 wherein said tube is disposed vertically with said inlet being located below the outlet, and including a hopper for containing said fluent material and feeding the same into said tube inlet.

6. Apparatus according to claim 5 wherein said tube is mounted for rotation relative to said hopper, and said blade rotating means includes means connected to said tube for rotating the same in one direction and means connected to said shaft for rotating the same in the opposite direction.

7. Apparatus according to claim 6 including a manifold rotably receiving the upper end of the tube and providing a lateral discharge from the tube outlet.

8. Apparatus for displacing fluent material, comprising:
- a tube having an inlet at one location and an outlet spaced from said inlet,
- a shaft extending axially inside said tube,
- means mounting said shaft for combined rotary and axial motion relative to said tube,
- a first helical blade mounted to said shaft,
- a second helical blade of a pitch opposite said first helical blade mounted to said tube,
- said first and second helical blades being interrupted by a pair of closely-spaced radially extending edges providing narrow gaps therebetween at diametrical locations to divide each blade into a pair of blade sections per unit of pitch,
- said gaps being aligned axially with one another on the shaft mounted blade sections and being aligned axially with one another on the tube mounted blade sections,
- each pair of the shaft mounted blade sections having a leading section and a trailing section,
- said blade and tube mounted sections cooperating with one another to cause the leading shaft mounted blade sections to advance first along one side of one of the tube-mounted blade section pairs for displacing the shaft and its blades axially in one direction and then along the opposite side of the other one of the tubemounted blade-section pairs for displacing the shaft and its blades axially in the opposite direction, and
- means for rotating said shaft relative to said tube,
- whereby fluent material admitted into the tube inlet is displaced axially in the tube to exit from the outlet.

* * * * *